UNITED STATES PATENT OFFICE.

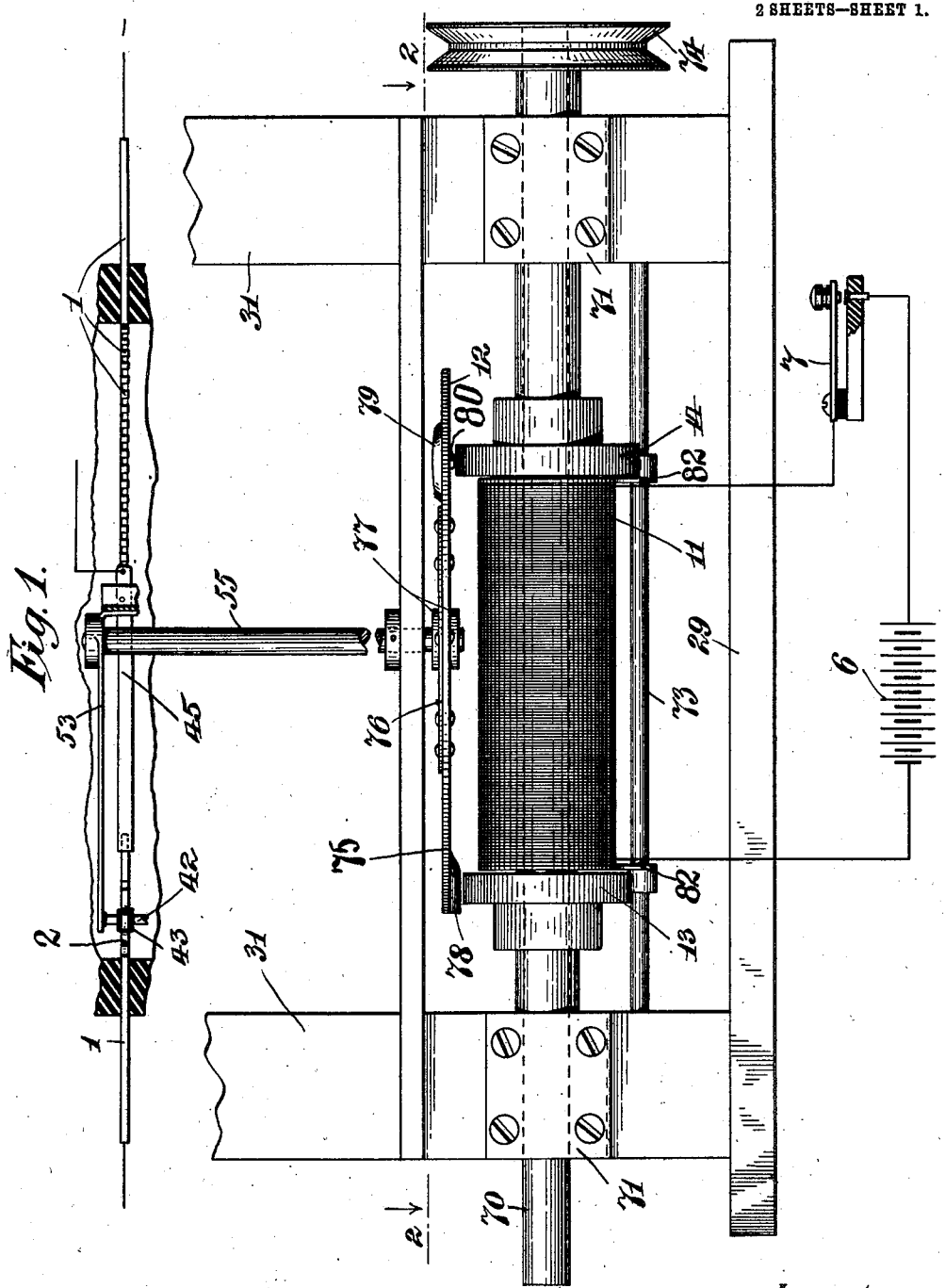

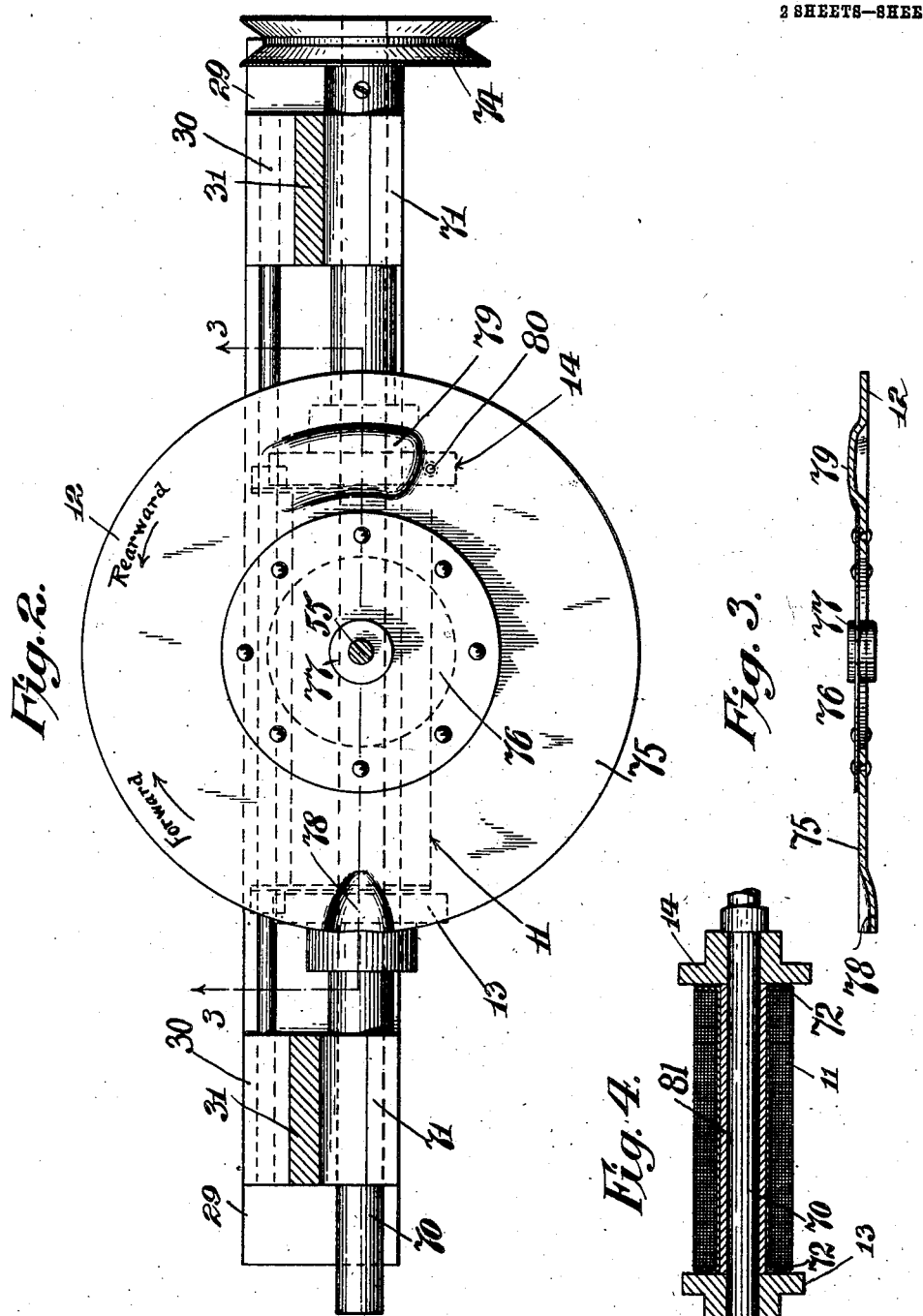

FRANK R. McBERTY, OF NEW ROCHELLE, NEW YORK, ASSIGNOR TO WESTERN ELECTRIC COMPANY, OF CHICAGO, ILLINOIS, A CORPORATION OF ILLINOIS.

POWER-TRANSMITTING DEVICE.

No. 922,802.     Specification of Letters Patent.     Patented May 25, 1909.

Application filed February 27, 1908. Serial No. 418,124.

*To all whom it may concern:*

Be it known that I, FRANK R. MCBERTY, a citizen of the United States, residing in the town of New Rochelle, in the county of Westchester and State of New York, have invented a certain new and useful Improvement in Power-Transmitting Devices, of which the following is a full, clear, concise, and exact description.

My invention relates to a device for transmitting power from a driving part to a driven part through the medium of clutch mechanism under the control of an electro-magnet. More particularly, my invention has for its object the provision of electro-magnetically actuated clutch mechanism under the control of which the driving part may cause the driven part to start, stop, and move in one direction or another, and at a speed having any desired relation to the speed of movement of the driven part,—this complex control of the driving over the driven part being exercised with the maximum simplicity of apparatus and with the greatest degree of reliability in the operation of the mechanism.

Furthermore, it is the object of my invention to provide a device in which the direction in which the driven part is moved is automatically determined by the relation which exists between the portion of the clutch mechanism associated with the driven part and the portion of the mechanism associated with the driving part, an actuation of the clutch mechanism when the driven part is in its normal position causing the movement of that part in one direction, while the energization of the clutch device when the driven part is out of its normal position results in that part being moved in the other direction back to its position of rest. By means of this novel feature it becomes possible to cause the starting, the stopping, and the movement of the driven part in one direction or the other by merely opening and closing a simple circuit in which the energizing winding of the clutch magnet is included. This result I preferably secure by arranging the clutch member associated with the driven part so that in the normal position of the driven part the member is attracted at one point into engagement with the clutch member associated with the driving part, while when the driven part is out of its normal position the clutch member associated with that part is attracted at another point into engagement with the clutch member associated with the driving part.

My invention also contemplates a relation between the clutch members which permits the driven part to be moved at different rates of speed with a constant rate of speed of the driving part; and also the provision of a connection between the driven part and its associated clutch member that enables that member to be freely moved into engagement with its coöperating clutch member, while at the same time it is rigidly secured to the driven part with respect to the movement of rotation of that part.

The above and other features of my invention will be more specifically set forth in the description which follows, and will be pointed out in the appended claims.

I shall now particularly describe my invention by reference to the accompanying drawings, in which—

Figure 1 represents one embodiment of my invention applied to the particular work of controlling the movement of an electrical switch; Fig. 2, a plan view of the device on line 2—2 of Fig. 1; Fig. 3, a cross section of the clutch disk on line 3—3 of Fig. 2; and Fig. 4, a detail view partially in section of the arrangement of the clutch magnet upon the driving shaft.

As illustrated in the drawings, the present embodiment of my invention is mounted in a frame the upper portion of which may serve to support the device which is to be operated through the medium of the power-transmitting mechanism. In the present instance this device is shown to be a switch designed to serve for completing connection between a movable contact part or terminal 2 and any one of a number of stationary contact parts or terminals 1. The stationary terminals 1 are mounted in a row in the arc of a circle, and consist of metal punchings supported in a block of insulating material and having one of the ends of each projecting through the inner face of the block into position to be engaged by the movable contact or terminal 2. The movable terminal 2 consists, in the present instance, of a metal punching in the form of a bell-crank lever, one of the arms of the lever having a rounded face adapted in the movement of the movable terminal to be brought into engagement with the stationary terminals 1, one after another, and the other arm being engaged by a leaf spring 45, which serves to press the contact face of the lever against the stationary terminals over which it passes. The movable contact lever is fulcrumed upon a rod 42, from which it is insulated by an insulating bushing 43. The fulcrum rod 42 is supported upon a frame 53 that is secured by means of a collar to the driven shaft 55, the frame also serving to support the leaf spring 45. Parts of the switch mechanism are shown broken away to indicate that a plurality of the parts illustrated may, if desired, be employed and operated by the power-transmitting device. The circuits which the switch controls are connected to the movable and stationary terminals as indicated.

The power-transmitting device of my invention is particularly adapted for controlling the movement of electrical switches, as shown in the drawing; but it will, of course, be understood that it is capable of being efficiently employed with a diversity of mechanism, and that its use is not restricted to devices of the character of that particularly illustrated and described.

The movement of the electric switch or other mechanism operated by the power-transmitting device of my invention, is effected in the embodiment here illustrated, by means of power derived from a constantly rotating shaft and controlled in its application to the switch carriage, or other driven part, by means of the electro-magnetic clutch mechanism. The power or driving shaft 70, as shown, is journaled in split bearings 71, mounted on the frame that supports the electric switch or other driven device, the bearings being supported upon the two uprights 31. The shaft 70 is of steel; but between the bearings 71 it is surrounded by a sleeve 81 (Fig. 4) of Norway iron, which shields the shaft from the magnetic effect of the magnetizing winding that surrounds the sleeve and shaft, and neutralizes by its short-circuiting action any permanent magnetism due to the magnetic retentivity of the steel of the shaft. If desired the shaft may be made of non-magnetic material, with only such parts of it of magnetic material as are involved in the operation of the clutch mechanism.

The shaft 70 carries two circular heads 13 and 14 of Norway iron, these heads being conveniently secured to the shaft by means of set screws (not shown), and constituting the pole pieces of the magnet which forms one element of the magnetic clutch. The head 14 is preferably of somewhat greater diameter than the head 13, for a purpose which will hereinafter be explained. Between the heads 13 and 14 is a magnetizing helix or winding 11 through which the shaft with its soft iron sleeve passes loosely, the winding being placed upon a spool with metallic heads 72 having projecting portions 82 (Fig. 1) by means of which the spool is supported upon a transverse rod 73 the ends of which are secured in the lugs 30 at the base of the frame. Power is communicated to the power shaft 70 to cause its rotation through the medium of a pulley wheel 74 secured to one end of the shaft, or in any other convenient manner. As the shaft rotates the soft iron sleeve and the attached ends 13 and 14 turn with it, while the spool containing the magnetizing winding 11, through which the shaft passes, remains stationary.

Firmly secured to the lower end of the shaft 55 of the driven device is a disk or plate 12, which serves as the armature for the electro-magnet made up of the magnetizing winding 11, power shaft 70 and the heads 13 and 14, and which constitutes the other element or member of the magnetic clutch that controls the application of power to the movement of the driven device. The armature disk or plate 12 of the clutch magnet consists of an annulus 75 of soft iron having as its support or supporting connection a thin plate or diaphragm 76 conveniently made of steel, bronze or like elastic material, riveted over the central aperture, and having at its center a collar 77 in which the end of the shaft of the driven device is fastened. Two dents 78 and 79 are formed in the clutch magnet disk, at points that are substantially diametrically opposite each other, the dent 78, in the normal position of the switch carriage or other driven mechanism lying directly over the head 13 of the clutch magnet, and the dent 79 lying directly over the head 14. The dent 78 is formed so as to cause a depression in the upper side of the disk and a protrusion on the under side of the disk, while the dent 79 is formed to cause a depression on the under side of the disk and a protrusion on the upper side.

As illustrated in the drawings, the clutch magnet occupies a position somewhat offset with respect to the driven disk or plate 12 of the switch carriage; that is, it is so mounted with respect to the disk that the head 13 of the magnet is presented to the disk at a considerably greater distance from the center of support of the disk upon its shaft than the point at which the head 14 of the magnet is presented. I have already stated that the head 14 of the clutch magnet is of somewhat greater diameter than the head 13. As a result, the disk 12 being adapted to rotate in a plane substantially parallel to the axis of the power shaft 70, the head 14 normally lies closer to the plane of the surface of the disk 12 than does the head 13. Therefore, when the clutch magnet is energized a greater attractive force would ordinarily be developed between the head 14 and the disk than between the head 13 and the disk. But, as has been described, when the switch carriage or driven device is in its normal position the disk 12 lies with the dent 78 directly over the head 13, and with the dent 79 directly over the head 14. Consequently, in the normal position of the switch carriage, the downward protuberence caused by the dent 78 brings the disk into close relation with the head 13, while the depression on the under side of the disk caused by the dent 79 causes the disk to lie considerably farther than its normal distance away from the head 14. When the clutch magnet is energized, therefore, while the switch carriage is resting in its normal position, the attractive force developed between the smaller head 13 and the disk 12 is considerably in excess of that developed between the larger head 14 and the disk, and as a result the disk is drawn into engagement with the head 13 and is tilted away from the head 14. But, on the other hand, if the switch carriage is not resting in its normal position, the dents 78 and 79 no longer modify the normal relation wherein the surface of the disk lies closer to the head 14 than to the head 13, and as a result when the clutch magnet is energized, the disk is attracted into engagement with the larger head 14 and is tilted away from the smaller head 13. In both cases when the clutch magnet is deënergized the elasticity of the diaphragm 76 at the center of the disk immediately draws the disk out of engagement with the head and restores it to its normal position.

It is desirable that the element of the clutch magnet through which the power of rotation is applied to the driven device shall be free to move into and out of engagement with the rotating part, under the influence of the electro-magnetic action, but at the same time shall be rigidly connected to the shaft of the driven device with respect to the rotational movement thereof. This purpose is served admirably by the construction which I have illustrated and described, which involves the elastic diaphragm as the connecting medium between the shaft of the switch carriage and the armature of the magnetic clutch. This elastic connection leaves the disk free for flatwise movement into engagement with the clutch magnet, but holds it in rigid connection with the shaft of the switch carriage with respect to the edgewise movement of rotation.

I have heretofore mentioned the fact that the disk 12 and the clutch magnet are preferably so related that the head 13 is adapted to engage the disk at a greater distance from the center of the disk than the head 14. This arrangement is employed for two purposes; one is to cause the switch carriage to move faster when the disk is in engagement with the head 14 than when it is in engagement with the head 13; and the other is to keep separate the paths of engagement of the heads with the disk, so that either path may be given whatever characteristics it may require without affecting the other path. Thus the path of engagement of the head 13 with the disk requires that at a certain point a dent 78 of a certain form shall be provided, while the path of engagement of the head 14 with the disk requires that at a certain point a dent 79 of another form shall be provided. By causing the heads to engage at different distances from the center of the disk neither dent is brought into the path of movement on the disk of the head with which it is not associated.

The advantage of having the driven device move faster at one time than at another in the particular use to which I have shown the device of my invention applied, is that the return of the movable terminal of the switch to its normal or resting position may be effected at a higher rate of speed than the advance of that terminal to connect with a particular one of the stationary terminals, the speed of advance being necessarily slower to permit accurate selection of the desired stationary terminal. It will be understood that although, in the present instance, the arrangement of the parts is such that the return movement of the driven device is executed at a higher rate of speed than the advance movement, this relation may be reversed by merely changing the relation of the engaging portions of the clutch members to each other, or the speed in both directions may be made the same. Likewise, by a mere change in the relation of the engaging portions of the clutch members the driven device may be selectively operated to move at different rates of speed in the same direction.

The driven disk 12 is provided with a rivet 80 having a head which projects on the under side of the disk in close proximity to the deep end of the dent 79, and which forms a stop for preventing the disk being driven beyond this point by the head 14 in the return movement of the switch carriage. As has been stated before, when the switch carriage is in its normal position the dent 78 lies directly over the head 13 of the clutch magnet, and within the actuating range of its magnetic attraction while the dent 79 lies directly over the head 14, so that the energization of the magnet causes the disk to be drawn into engagement with the head 13 and to be tilted away from the head 14. The rotation of the power shaft 70 is such as to cause the switch carriage to be rotated in a clockwise direction when the disk 12 is in engagement with the head 13, so that after the magnet has been energized the head 13 remains in engagement with the disk and the carriage continues to be rotated from left to right until the magnet is deënergized. Upon a subsequent energization of the magnet, the surface of the disk now being closer to the head 14 than to the head 13, and within the actuating range of the magnetic attraction of head 14 that head attracts the disk into engagement with it and tilts the disk away from the head 13; and, engaging the disk as it does on the other side of its center, causes the switch carriage to move in a reverse direction, from right to left, until the disk has been rotated far enough to bring the dent 78 over the head 13 and the dent 79 over the head 14. In this position the attractive force between the head 14,—which is driving the disk in its return movement,—and the disk is decreased, while the attractive force between the other head 13 and the disk is augmented; and at the same time the head of the rivet 80 is brought into position where, if the engagement between the head 14 and the disk persists, it is interposed as a positive stop to any further return movement.

In order that the magnetic attraction between the clutch magnet and the disk may cease promptly upon the cessation of current flow in the magnetizing winding 11, I prefer to employ a construction for the clutch and its armature disk or plate such as that which I have shown and described, wherein the magnetic circuit is not completely closed during the energization of the magnet, but has a small air gap (the space between disk 12 and one of the heads 13, 14) either at one pole or the other which insures prompt de-magnetization when the current ceases to circulate in the winding.

The peculiar construction of the clutch is adapted to the same end, namely, promptly disengaging the disk from the clutch magnet, because of the rolling magnetic contact between the driving and driven elements. It will be apparent that the greatest magnetic flux will occur at the line of contact between the driving disk and the driven disk. While the solenoid is excited the magnetism is renewed each instant at the point of contact; but when the solenoid becomes inert, the rolling motion of the parts tends to shift the point of maximum magnetic flux constantly and the flux is reduced or destroyed promptly by inequalities in the magnetic contact, and by hysteresis and eddy currents occurring in the iron itself. The effects of the retentivity or residual magnetism in the iron are thus reduced to a minimum, and prompt separation of the parts after reduction of the current in the solenoid is brought about. This result is of great importance in motors for driving switch mechanisms in automatic exchanges.

As a means of effecting the energization and deënergization of the clutch magnet to cause the starting, stopping, and return to its normal position of the switch or other driven device, I have illustrated a simple circuit including the winding of the clutch magnet with a source of current 6, the continuity of the circuit being controlled by a switch key 7. If the switch or driven part is in its normal or resting position, and the switch key 7 is depressed to close the energizing circuit, the clutch disk 12 is drawn into engagement with the magnet head 13 and is tilted away from the magnet head 14, on account of the surface of the clutch disk 12 at that time lying closer to the magnet head 13 than to the head 14. Having been attracted into engagement with the head 13, the surface of the disk remains in engagement with this head and out of engagement with the other head so long as the key 7 is held depressed and current continues to flow through the winding of the clutch magnet. When, in the present instance, the movable terminal of the switch has been rotated far enough to cause it to complete connection with the desired one of the stationary terminals, the key 7 is released and, the clutch magnet being promptly deënergized, the clutch disk 12, impelled by the tension imparted to it by the elastic diaphragm 76, springs away from the magnet head 13 with which it has been in engagement.

In the off-normal position to which the clutch disk 12 has thus been advanced, the relation between the plane surface of the disk and the magnet head is no longer modified by the dents 78 and 79 which lie above the heads in the normal position of the disk, and the head 14, being of greater diameter, lies closer to the surface of the clutch disk than the head 13, as has heretofore been explained. Consequently, when the energizing circuit is again completed by depressing the key 7, the clutch disk is attracted into engagement with the head 14 and is tilted away from the head 13, and the return movement of the driven device begins. The disk remains in engagement with the head 14 and the return movement continues as long as the energizing circuit remains closed, or until the clutch disk has been rotated back to its normal position, as shown in the drawings. When this position has been reached further return movement is prevented by the engagement between the magnet head 14 and the head of the rivet 80; and, the switch key 7 being released, the clutch disk comes to rest with its surface again in position to cause the disk to be attracted into engagement with the head 13 and to be tilted away from the head 14 when the clutch magnet is again energized.

I have illustrated a simple manually operated key for controlling the energizing circuit of the clutch device, but it will be understood that the energizing circuit may be controlled by automatic switch mechanism, relays, or in any other desired manner, depending upon the character of the use to which the device is put. It will also be understood that the relation between the engaging parts of the clutch members may be varied to secure the selective actuation of the driven part by the driving part or in other ways than that particularly shown without departing from my invention; as, for instance, by causing the clutch member associated with the driven part to be selectively attracted to one or another of two oppositely moving points on the periphery of a single magnet head, instead of into engagement with two magnet heads at points on opposite sides of the center of support of the clutch member upon the driven shaft.

I claim:

1. A power-transmitting device, comprising a driving shaft and a driven shaft, and an electro-magnetic clutch having one member secured to one of said shafts and another member secured to the other of said shafts, one of said clutch members being arranged with its surface in proximity to the other of said clutch members at two points, and being adapted when attracted at one point to cause the movement of the driven shaft in one direction, and when attracted at the other point to cause the movement of the driven shaft in the other direction.

2. A power-transmitting device, comprising a driving part and a driven part, and an electro-magnetic clutch having one member secured to one of said parts and another member secured to the other part, the members of said clutch being adapted to be attracted into engagement with each other at one or the other of two points to cause the movement of the driven part in one direction or the other.

3. A power-transmitting device, comprising a driving shaft and a driven shaft, and an electro-magnetic clutch having one member connected to the driven shaft and another member connected to the driving shaft, said clutch members being adapted to be attracted into engagement with each other at either of two points, and means for causing the engagement to take place at one of the points when the driven shaft is in its normal position, and at the other point when said driven shaft is out of its normal position.

4. A power-transmitting device, comprising a driving shaft and a driven shaft, and an electro-magnetic clutch having one member connected to said driven shaft and another member connected to said driving shaft, the members of said clutch being adapted to be selectively attracted into engagement with each other at either of two points to cause said driven shaft to rotate at different rates with respect to the rate of rotation of said driving shaft.

5. A power-transmitting device, comprising a driving shaft and a driven shaft, a clutch disk connected to one of said shafts, and a clutch magnet having magnet heads secured to the other of said shafts, said heads being presented to said clutch disk at opposite sides of its point of support upon its shaft, said clutch disk being adapted when attracted into engagement with one of said heads to be tilted away from the other of said heads, whereby an air gap is maintained in the magnetic circuit during the energization of the clutch magnet to insure prompt demagnetization when current ceases to flow.

6. A power-transmitting device, comprising a driving shaft and a driven shaft, and an electro-magnetic clutch including two members, one adapted to drive the other by rolling contact therewith, one of said members being connected to said driving shaft, the magnetic circuit of said clutch being provided with an air gap during the energization of the clutch to insure prompt demagnetization when the clutch is deënergized.

7. A power-transmitting device, comprising a driving shaft and a driven shaft, and an electro-magnetic clutch having one member associated with the driven shaft and another member associated with the driving shaft, said members being adapted to be attracted into engagement with each other at either of two points to cause the rotation of the driven shaft in one direction or the other, the attraction of said members into engagement with each other at one point causing their separation at the other point.

8. A power-transmitting device, comprising a driving shaft and a driven shaft, a clutch magnet associated with one of said shafts and a clutch disk associated with the other of said shafts, said clutch disk being adapted to be attracted to said magnet at one side of the point of support of said disk when said driven shaft is in its normal position, and being adapted to be attracted to said magnet at the other side of said point of support when said driven shaft is out of its normal position.

9. A power-transmitting device, comprising a driving shaft and a driven shaft, a clutch magnet arranged upon one of said shafts, two magnet heads for said magnet secured to said shaft, and a clutch member secured to the other shaft, said clutch member being adapted to be attracted to one or the other of the heads of said magnet.

10. A power-transmitting device, comprising a driving shaft and a driven shaft, a magnet associated with one of said shafts, two magnet heads for said magnet secured to said shaft, and a clutch member associated with the other shaft, said clutch member lying closer to one of said heads than to the other when said driven shaft is in its normal position, and lying closer to the other of said heads when the driven shaft is out of its normal position.

11. A power-transmitting device, comprising a driving shaft and a driven shaft, a clutch disk secured to one of said shafts, and a clutch magnet associated with the other of said shafts, said magnet having two heads secured to the shaft and presented to said clutch disk on opposite sides of the point of support of said disk upon its shaft, one of said heads being presented to said disk at a point closer to the point of support of said disk than the other head, whereby the driven shaft may be caused to advance and recede at varying speeds with a constant speed of rotation of said driving shaft.

12. A power-transmitting device, comprising a driving shaft and a driven shaft, a clutch member secured to one of said shafts, a clutch magnet associated with the other of said shafts, two magnet heads for said magnet secured to said shaft, said heads being presented to said clutch member at different distances from its point of support upon its shaft, and means for causing said clutch member to be brought selectively into engagement with said heads, whereby said driven shaft may be moved at different speeds with a constant speed of rotation of said driving shaft.

13. A power-transmitting device, comprising a driving shaft and a driven shaft, a clutch disk secured to one of said shafts and adapted to rotate therewith, a clutch magnet associated with the other shaft and having magnet heads secured to said shaft, said heads being presented to said clutch disk at different distances from its point of support upon its shaft, and means for causing the selective attraction of said clutch disk into engagement with one or other of said heads to cause a variable rate of rotation of said driven shaft with a constant rate of rotation of said driving shaft.

14. A power-transmitting device, comprising a driving shaft, and a driven shaft disposed substantially at right angles thereto, a clutch disk secured to one of said shafts, a clutch magnet arranged upon the other of said shafts and having two circular magnet heads or poles secured to the shaft, said magnet heads or poles being presented to said clutch disk at opposite sides of its point of support upon its shaft and at different distances from said point of support, and means for effecting the selective attraction of said clutch disk into engagement with one or the other of said heads, whereby the driven shaft may be rotated in one direction or the other at different speeds with respect to the speed of rotation of said driving shaft.

15. A power-transmitting device, comprising a driving shaft, and a driven shaft arranged substantially at right angles thereto, a clutch disk secured to one of said shafts, a clutch magnet associated with the other of said shafts and having two magnet heads secured to the shaft, said magnet heads being of different diameters and being presented to said clutch disk on opposite sides of its point of support, and means for effecting the selective attraction of said disk into engagement with one or the other of said heads, whereby the driven shaft may be moved in one direction or the other and at different speeds with respect to rate of rotation of said driving shaft.

16. A power-transmitting device, comprising a driving shaft, and a driven shaft disposed substantially at right angles thereto, a clutch disk secured to one of said shafts, a clutch magnet associated with the other of said shafts and having two magnet heads secured to the shaft, said magnet heads being of different diameters and being presented to said clutch disk at opposite sides of its point of support upon its shaft, and a projection upon the portion of the surface of said clutch disk to which the magnet head of the smaller diameter is presented when said driving shaft is in its normal position, said head of smaller diameter lying closer to the surface of said disk than said head of larger diameter when said driven shaft is in its normal position, and being more remote from the surface of the disk when its driven shaft is out of its normal position.

17. A power-transmitting device, comprising a driving shaft and a driven shaft, a clutch disk secured to one of said shafts, a clutch magnet associated with the other of said shafts and having two magnet heads secured to said other shaft, said magnet heads being presented to the surface of said clutch disk on opposite sides of its point of support upon its shaft, said clutch disk being provided with a projection and with a depression of the surface to which said magnet heads are presented, said projection lying over one of said magnet heads and said depression lying over the other of said heads in the normal position of the driven shaft.

18. A power-transmitting device, comprising a driving shaft, and a driven shaft disposed substantially at right angles thereto, a clutch disk secured to one of said shafts, a clutch magnet associated with the other of said shafts, said clutch magnet having two magnet heads presented to the surface of said clutch disk at opposite sides of its point of support upon its shaft, said clutch disk having a projection and a depression of that surface to which said magnet heads are presented, the projection lying over one of the heads and the depression lying over the other of the heads in the normal position of the driven shaft, and a non-magnetic stud carried by said disk and adapted to stop the return movement of said driven shaft when it reaches its normal position.

19. A power-transmitting device, comprising a driving shaft and a driven shaft, a clutch magnet associated with one of said shafts and having a magnet head secured to said shaft, and a clutch disk with one of its flat surfaces lying in proximity to but normally out of engagement with said magnet head, said clutch disk being secured to the other shaft loosely with respect to flatwise movement but rigidly with respect to edgewise movement.

20. A power-transmitting device, comprising a driving shaft and a driven shaft, a clutch magnet having a magnet head associated with one of said shafts, a clutch disk having one of its flat surfaces in proximity to but normally out of engagement with said magnet head, and an elastic diaphragm at the center of said disk, said disk being secured to said other shaft through the medium of said elastic diaphragm, whereby said disk may incline its plane to be drawn into engagement with said magnet head when the magnet is energized but is prevented from rotating with relation to its shaft.

21. A power-transmitting device, comprising a driving shaft and a driven shaft, a flexible disk secured to said driven shaft, an electro-magnet arranged upon said driving shaft with its axis substantially coinciding with the axis of the shaft, and circular heads for said magnet, said disk being adapted to be selectively attracted into engagement with one or another of said heads when said electro-magnet is energized.

22. A power-transmitting device, comprising a driving shaft and a driven shaft, a clutch disk secured to one of said shafts rigidly with respect to rotational movement but loosely with respect to flatwise movement, an electro-magnet having magnet heads secured to the other of said shafts and presented to the surface of said clutch disk at two points, and means for causing the flatwise movement of said clutch disk selectively into engagement with said magnet heads at either of the two points.

23. A power-transmitting device, comprising a driving part and a driven part, and an electro-magnet clutch having one member secured to one of said parts rigidly with respect to edgewise movement but flexibly with respect to flatwise movement, and another coöperating clutch member secured to said other part, said first mentioned clutch member being adapted to be moved flatwise into engagement with said coöperating member selectively at either of two points to effect the movment of said driven part in one direction or another.

24. A power-transmitting device, comprising a driving shaft and a driven shaft arranged substantially at right angles thereto, a clutch disk secured to said driven shaft rigidly with respect to rotational movement but flexibly with respect to flatwise movement, an electro-magnet having its magnetizing helix wound about said driving shaft, and heads for said electro-magnet secured to and rotating with said driving shaft, said heads being presented to one of the flat surfaces of said clutch disk at opposite sides of its point of support upon its shaft, said disk and heads being arranged to cause the surface of the disk to lie closer to one of the heads in an off-normal position, whereby the disk is attracted flatwise into engagement with one of said heads to drive the shaft in one direction when the driven shaft is in its normal position, and into engagement with the other head to drive the shaft in the reverse direction when said shaft is out of its normal position.

25. A power-transmitting device, comprising a driving shaft and a driven shaft, one of said shafts being of material having high magnetic retentivity, a clutch magnet having a magnetizing helix surrounding said shaft, a sleeve of material having low magnetic retentivity interposed between said helix and said shaft to neutralize and prevent the permanent magnetization thereof, pole pieces for said clutch magnet, and a coöperating clutch member associated with said driven shaft and adapted to be drawn into engagement with one of said pole pieces when the clutch is energized.

26. In a power-transmitting device, the combination of a friction wheel, an electromagnet, an armature for the magnet in the form of a friction wheel adapted when attracted by the magnet to be brought into rolling contact with the first-named friction wheel, and a yielding support for the armature acting to hold it out of contact with the first-named friction wheel when not attracted by the magnet.

27. In a power-transmitting device, the combination of two rotary friction disks of magnetic material, one of which is yieldingly supported and adapted to be moved into rolling contact with the other by magnetic attraction, the rotation of said yieldingly supported disk operating to change its relation to the other friction disk from a position within the actuating range of magnetic attraction to a position beyond said actuating range of attraction.

28. In a power-transmitting device, the combination of a pair of friction wheels adapted for rolling contact with each other, one of said wheels being supported yieldingly to move to the other, and a magnetizing helix adapted to produce a flux through the rolling contact, said friction disks being formed to be nearer together in one position of rotation than in another; whereby when nearest together they may be brought into a frictional contact by the magnetizing helix, so held during continuous magnetization thereof, and when released by said helix will assume said position of wider separation.

29. In a power-transmitting device, the combination of three friction disks, a magnetizing helix adapted to magnetize either of two of said disks to attract the third into rolling contact with it, said third disk being formed to be beyond the actuating range of attraction of said other disks in different positions alternately, and yielding supporting means adapted to permit either pair of disks to remain in contact during continued magnetization thereof.

30. In a power-transmitting device, the combination of a yieldingly supported driven friction disk, two driving disks at points on opposite sides of the axis thereof, and a magnetizing helix acting upon said driven disk to bring it into contact with one or the other of said driving disks, said driven disk being carried by each driving disk into position to be brought into contact with the other driving disk upon a succeeding energization of the helix.

FRANK R. McBERTY.

Witnesses:
NICHOLAS E. KERNAN,
WILLIAM G. McKNIGHT.